(12) United States Patent
Yu et al.

(10) Patent No.: US 12,192,757 B2
(45) Date of Patent: Jan. 7, 2025

(54) METHODS AND DEVICES FOR PROTECTING PRIVACY OF SLICE IDENTITY INFORMATION

(71) Applicant: ZTE Corporation, Shenzhen (CN)

(72) Inventors: Wantao Yu, Shenzhen (CN); Yuze Liu, Shenzhen (CN); Shilin You, Shenzhen (CN); Jin Peng, Shenzhen (CN); Zhaoji Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 399 days.

(21) Appl. No.: 17/738,279

(22) Filed: May 6, 2022

(65) Prior Publication Data

US 2022/0264289 A1 Aug. 18, 2022

Related U.S. Application Data

(63) Continuation of application No. PCT/CN2019/116676, filed on Nov. 8, 2019.

(51) Int. Cl.
*H04W 12/02* (2009.01)
*H04W 8/02* (2009.01)
(Continued)

(52) U.S. Cl.
CPC .............. *H04W 12/02* (2013.01); *H04W 8/02* (2013.01); *H04W 12/08* (2013.01); *H04W 60/04* (2013.01); *H04W 72/21* (2023.01); *H04W 76/10* (2018.02)

(58) Field of Classification Search
CPC ....... H04W 12/02; H04W 8/02; H04W 12/08; H04W 60/04; H04W 72/21; H04W 76/10;
(Continued)

(56) References Cited

U.S. PATENT DOCUMENTS

2018/0270666 A1* 9/2018 Lee .................... H04W 12/069
2019/0029065 A1* 1/2019 Park ........................ H04W 8/08
(Continued)

FOREIGN PATENT DOCUMENTS

CN 101400054 A 4/2009
CN 109219111 A 1/2019
(Continued)

OTHER PUBLICATIONS

International Search Report and Written Opinion regarding PCT/CN2019/116676 dated Jul. 20, 2020.
"3GPP TR33.813 V0.7.0" 3rd Generation Partnership Project, "Technical Specification Group Services and System Aspects; Security Aspects; Study on Security Aspects of Enhanced Network Slicing," http://www.3gpp.org/ftp/Specs/archive/33_series/33.813/, Oct. 30, 2019, part 7.12.
(Continued)

*Primary Examiner* — Don N Vo
(74) *Attorney, Agent, or Firm* — Crowell & Moring LLP

(57) ABSTRACT

Method, systems and devices for wireless communication. The method includes protecting privacy of a transmitted network slice selection assistance information (NSSAI) between a user equipment and a base station. The method includes receiving a temporary NSSAI (T-NSSAI) from an access and mobility management function (AMF) to the base station, the T-NSSAI comprising at least one temporary single NSSAI (T-S-NSSAI) and storing the T-NSSAI in the base station. The method also includes receiving a radio resource control (RRC) signaling message from the user equipment to the base station, the RRC signaling message comprising a T-S-NSSAI corresponding to an allowed single NSSAI (S-NSSAI); and selecting the AMF based on the T-S-NSSAI.

15 Claims, 26 Drawing Sheets

(51) Int. Cl.
  *H04W 12/08* (2021.01)
  *H04W 60/04* (2009.01)
  *H04W 72/21* (2023.01)
  *H04W 76/10* (2018.01)

(58) Field of Classification Search
  CPC ....... H04W 8/26; H04W 48/18; H04W 12/75; H04W 60/00
  USPC .......................................................... 455/411
  See application file for complete search history.

(56) References Cited

U.S. PATENT DOCUMENTS

2020/0267781 A1* 8/2020 Lee .................. H04W 76/36
2021/0076318 A1* 3/2021 Zong ................. H04W 8/12

FOREIGN PATENT DOCUMENTS

| CN | 109565746 A | 4/2019 |
| CN | 110583034 A | 12/2019 |
| EP | 3949323 A1 | 9/2022 |
| WO | WO 2018169244 | 9/2018 |
| WO | WO 2018169743 | 9/2018 |
| WO | WO 2019063387 A1 | 4/2019 |
| WO | WO 2019073977 | 4/2019 |
| WO | WO 2020205609 A1 | 10/2020 |

OTHER PUBLICATIONS

"3GPP TS38.300 VI5.7.0" 3rd Generation Partnership Project, "Technical Specification Group Radio Access Network; NR; NR and NG-RAN Overall Description; Stage 2," http://www.3gpp.org/ftplSpecs/archive/38_series/38.300/, 26 Sep. 26, 2019, part 16.3
E1 Australian Notice of Acceptance regarding 2019472977 dated Jan. 30, 2024, 3 pages.
Australian Examiner's Report No. 1 regarding 2019472977 dated Feb. 2, 2023.
International Search Report and Written Opinion regarding EP 19 95 1273.2 dated Oct. 11, 2022.
"3 Generation Partnership Project; Technical Specification Group Services and System Aspects; Security Aspects; Study on Security Aspects of Enhanced Network Slicing (Release 16)," 3GPP Standard; Technical Report; 3GPP TR 33.813, 3rd Generation Partnership Project (3GPP), Mobile Competence Centre, Sophia-Antipolis Cedex; France. vol. SA WG3, No. V0.7.0, Oct. 30, 2019, pp. 1-38. Retrieved from the Internet: URL:ftp://ftp.3gpp.org/Specs/archive/33_series/33.813/33813-070.zip 33813-070.docx.
Chinese Office Action with English translation regarding 2019801015804 dated Mar. 30, 2023, 16 pages.
Australian Office Action regarding 2019472977 dated Jun. 26, 2023.
Indonesian Office Action regarding P00202205260 dated Jun. 24, 2024, 7 pages.

* cited by examiner receiving a registration accept message during an initial registration procedure from the AMF to the base station, the registration accept message comprising a mapping relationship between at least one allowed S-NSSAI and at least one T-S-NSSAI;
450 sending the mapping relationship between at least one allowed S-NSSAI and at least one T-S-NSSAI from the base station to the user equipment so that the user equipment stores the mapping relationship between the at least one allowed S-NSSAI and the at least one T-S-NSSAI.
460

FIG. 4B receiving a second T-NSSAI from a second AMF to the base station, the second T-NSSAI comprising at least one T-S-NSSAI;

470

Storing the second T-NSSAI in the base station

480

FIG. 4C sending an user equipment message from the base station to the AMF, the user equipment message comprising the T-S-NSSAI

490

FIG. 4D for each S-NSSAI in the NSSAI, calculating a corresponding T-S-NSSAI based on the S-NSSAI according to a predetermined algorithm  512

FIG. 5B for each S-NSSAI in the NSSAI, generating a random information as a corresponding T-S-NSSAI based on the S-NSSAI  514

```
receiving a mapping relationship between the NSSAI and a temporary NSSAI (T-
NSSAI) from an access and mobility management function (AMF) to the base station,
the NSSAI comprising at least one single NSSAI (S-NSSAI), and the T-NSSAI
comprising at least one temporary single NSSAI (T-S-NSSAI);    710
```

```
storing the mapping relationship between the NSSAI and the T-NSSAI in the base
station
                                                                                       720
```

```
receiving a radio resource control (RRC) signaling message from the user equipment
to the base station, the RRC signaling message comprising a T-S-NSSAI
corresponding to an allowed single NSSAI (S-NSSAI);    730
```

```
identifying the allowed S-NSSAI based on the T-S-NSSAI in the base station
                                                                                       740
```

```
selecting the AMF based on the allowed S-NSSAI.
                                                                                       750
```

FIG. 7A receiving a registration accept message during an initial registration procedure from the AMF to the base station, the registration accept message comprising a mapping relationship between at least one allowed S-NSSAI and at least one T-S-NSSAI; 760 sending the mapping relationship between at least one allowed S-NSSAI and at least one T-S-NSSAI from the base station to the user equipment so that the user equipment stores the mapping relationship between the at least one allowed S-NSSAI and the at least one T-S-NSSAI. 770

FIG. 7B receiving a second mapping relationship between a second NSSAI and a second T-NSSAI from a second AMF to the base station;

780 storing the second mapping relationship between the second NSSAI and the second T-NSSAI in the base station.

790

FIG. 7C sending an user equipment message from the base station to the AMF, the user equipment message comprising the allowed S-NSSAI

800 obtaining a T-NSSAI based on a NSSAI, the NSSAI comprising at least one S-NSSAI and the T-NSSAI comprising at least one T-S-NSSAI;
810 generating a mapping relationship between the NSSAI and the T-NSSAI;
820 storing the mapping relationship between the NSSAI and the T-NSSAI in an AMF;
830 receiving an user equipment message from a base station, the user equipment message comprising an allowed S-NSSAI;
840 validating user equipment rights and slice availability based on the allowed S-NSSAI in the AMF.
850

```
receiving a temporary NSSAI (T-NSSAI) from an access and mobility management
function (AMF) to the base station, the T-NSSAI comprising at least one user
equipment specific temporary single NSSAI (UE-Specific T-S-NSSAI);
                                                                        1010
```

```
storing the T-NSSAI in the base station;
                                                                        1020
```

```
receiving a radio resource control (RRC) signaling message from the user equipment
to the base station, the RRC signaling message comprising a UE-Specific T-S-
NSSAI corresponding to an allowed S-NSSAI;                              1030
```

```
selecting the AMF based on the UE-Specific T-S-NSSAI .
                                                                        1040
```

FIG. 10A receiving a registration accept message during an initial registration procedure from the AMF to the base station, the registration accept message comprising a mapping relationship between at least one allowed S-NSSAI and at least one UE-Specific T-S-NSSAI;
1050 sending the mapping relationship between the at least one allowed S-NSSAI and the at least one UE-Specific T-S-NSSAI from the base station to the user equipment so that the user equipment stores the mapping relationship between the at least one allowed S-NSSAI and the at least one UE-Specific T-S-NSSAI
1060

FIG. 10B receiving a second T-NSSAI from a second AMF to the base station, the second T-NSSAI comprising at least one UE-Specific T-S-NSSAI;
1070 storing the second T-NSSAI in the base station.
1080

FIG. 10C sending an user equipment message from the base station to the AMF, the user equipment message comprising the UE-Specific T-S-NSSAI
1090

FIG. 10D

1100 obtaining a T-NSSAI based on a NSSAI, the NSSAI comprising at least one S-NSSAI and the T-NSSAI comprising at least one UE-Specific T-S-NSSAI;
1110 generating a mapping relationship between the NSSAI and the T-NSSAI;
1120 storing the mapping relationship between the NSSAI and the T-NSSAI in an AMF.
1130

```
┌─────────────────────────────────────────────────────────────────┐
│ receiving a mapping relationship between the NSSAI and a temporary NSSAI (T-
│ NSSAI) from an access and mobility management function (AMF) to the base station,
│ the NSSAI comprising at least one single NSSAI (S-NSSAI), and the T-NSSAI
│ comprising at least one UE-Specific T-S-NSSAI;           1310
└─────────────────────────────────────────────────────────────────┘
``` storing the mapping relationship between the NSSAI and the T-NSSAI in the base station;
1320 receiving a radio resource control (RRC) signaling message from the user equipment to the base station, the RRC signaling message comprising a UE-Specific T-S-NSSAI corresponding to an allowed single NSSAI (S-NSSAI);
1330 identifying the allowed S-NSSAI based on the UE-Specific T-S-NSSAI in the base station;
1340 selecting the AMF based on the allowed S-NSSAI
1350

FIG. 13A receiving a registration accept message during an initial registration procedure from the AMF to the base station, the registration accept message comprising a mapping relationship between at least one allowed S-NSSAI and at least one UE-Specific T-S-NSSAI;
1360 sending the mapping relationship between at least one allowed S-NSSAI and at least one UE-Specific T-S-NSSAI from the base station to the user equipment so that the user equipment stores the mapping relationship between the at least one allowed S-NSSAI and the at least one UE-Specific T-S-NSSAI.
1370

FIG. 13B

```
receiving a second mapping relationship between a second NSSAI and a second T-
NSSAI from a second AMF to the base station;
                                                                          1380
```
↓
```
storing the second mapping relationship between the second NSSAI and the second
T-NSSAI in the base station.
                                                                          1390
```

FIG. 13C

```
sending an user equipment message from the base station to the AMF, the user
equipment message comprising the allowed S-NSSAI.
                                                                          1399
```

FIG. 13D

1400 obtaining a T-NSSAI based on a NSSAI, the NSSAI comprising at least one S-NSSAI and the T-NSSAI comprising at least one UE-Specific T-S-NSSAI;
1410

↓ generating a mapping relationship between the NSSAI and the T-NSSAI;
1420

↓ storing the mapping relationship between the NSSAI and the T-NSSAI in an AMF;
1430

↓ receiving an user equipment message from a base station, the user equipment message comprising an allowed S-NSSAI;
1440

↓ validating user equipment rights and slice availability based on the allowed S-NSSAI in the AMF.
1450

FIG. 14

METHODS AND DEVICES FOR PROTECTING PRIVACY OF SLICE IDENTITY INFORMATION

CROSS-REFERENCE TO RELATED APPLICATION

This application is a continuation application of PCT International Patent Application No. PCT/CN2019/116676, filed with the China National Intellectual Property Administration, PRC on Nov. 8, 2019, which is herein incorporated by reference in its entirety.

TECHNICAL FIELD

The present disclosure is directed generally to wireless communications. Particularly, the present disclosure relates to methods and devices for protecting privacy of slice identity information.

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. A network slice selection assistance information (NSSAI) may be transmitted between a user equipment and a base station, and NSSAI may contain sensitive information that causes privacy concerns.

SUMMARY

This document relates to methods, systems, and devices for wireless communication, and more specifically, for protecting privacy of slice identity information.

In one embodiment, the present disclosure describes a method for protecting privacy of a transmitted network slice selection assistance information (NSSAI) between a user equipment and a base station. The method includes receiving a temporary NSSAI (T-NSSAI) from an access and mobility management function (AMF) to the base station, the T-NSSAI comprising at least one temporary single NSSAI (T-S-NSSAI) and storing the T-NSSAI in the base station. The method also includes receiving a radio resource control (RRC) signaling message from the user equipment to the base station, the RRC signaling message comprising a T-S-NSSAI corresponding to an allowed single NSSAI (S-NSSAI); and selecting the AMF based on the T-S-NSSAI.

In another embodiment, the present disclosure describes a method for protecting privacy of a transmitted network slice selection assistance information (NSSAI) between a user equipment and a base station. The method includes obtaining a T-NSSAI based on a NSSAI, the NSSAI comprising at least one S-NSSAI and the T-NSSAI comprising at least one T-S-NSSAI; and generating a mapping relationship between the NSSAI and the T-NSSAI. The method includes storing the mapping relationship between the NSSAI and the T-NSSAI in an AMF.

In another embodiment, the present disclosure describes a method for protecting privacy of a transmitted network slice selection assistance information (NSSAI) between a user equipment and a base station. The method includes determining whether a predetermined condition is satisfied in an AMF. In response to the determining that the predetermined condition is satisfied, the method includes obtaining a new T-S-NSSAI based on an allowed S-NSSAI, updating the stored mapping relationship between the allowed S-NSSAI and an old T-S-NSSAI with the new T-S-NSSAI, and canceling the old T-S-NSSAI; sending a new T-NSSAI comprising the new T-S-NSSAI to a base station so as to update a stored T-NSSAI in the base station; and sending the new T-S-NSSAI to a user equipment so that the user equipment updates the stored mapping relationship between the allowed S-NSSAI and the old T-S-NSSAI in the user equipment with the new T-S-NSSAI.

In another embodiment, the present disclosure describes a method for protecting privacy of a transmitted network slice selection assistance information (NSSAI) between a user equipment and a base station. The method includes receiving a mapping relationship between the NSSAI and a temporary NSSAI (T-NSSAI) from an access and mobility management function (AMF) to the base station, the NSSAI comprising at least one single NSSAI (S-NSSAI), and the T-NSSAI comprising at least one temporary single NSSAI (T-S-NSSAI); and storing the mapping relationship between the NSSAI and the T-NSSAI in the base station. The method includes receiving a radio resource control (RRC) signaling message from the user equipment to the base station, the RRC signaling message comprising a T-S-NSSAI corresponding to an allowed single NSSAI (S-NSSAI). The method includes identifying the allowed S-NSSAI based on the T-S-NSSAI in the base station; and selecting the AMF based on the allowed S-NSSAI.

In another embodiment, the present disclosure describes a method for protecting privacy of a transmitted network slice selection assistance information (NSSAI) between a user equipment and a base station. The method includes obtaining a T-NSSAI based on a NSSAI, the NSSAI comprising at least one S-NSSAI and the T-NSSAI comprising at least one T-S-NSSAI; and generating a mapping relationship between the NSSAI and the T-NSSAI. The method includes storing the mapping relationship between the NSSAI and the T-NSSAI in an AMF; receiving an user equipment message from a base station, the user equipment message comprising an allowed S-NSSAI; and validating user equipment rights and slice availability based on the allowed S-NSSAI in the AMF.

In another embodiment, the present disclosure describes a method for protecting privacy of a transmitted network slice selection assistance information (NSSAI) between a user equipment and a base station. The method includes determining whether a predetermined condition is satisfied in an AMF. In response to the determining that the predetermined condition is satisfied, the method includes obtaining a new T-S-NSSAI based on an allowed S-NSSAI and update the stored mapping relationship between the allowed S-NSSAI and the old T-S-NSSAI with the new T-S-NSSAI, and canceling the old T-S-NSSAI; obtaining a new mapping relationship between a NSSAI and a new T-NSSAI, the new T-NSSAI comprising the new T-S-NSSAI; sending the new mapping relationship between the NSSAI and the new T-NSSAI to a base station so as to update a stored mapping relationship in the base station; and sending the new T-S-NSSAI to a user equipment so that the user equipment updates the stored mapping relationship between the allowed S-NSSAI and the old T-S-NSSAI in the user equipment with the new T-S-NSSAI.

In another embodiment, the present disclosure describes a method for protecting privacy of a transmitted network slice selection assistance information (NSSAI) between a user equipment and a base station. The method includes receiving a temporary NSSAI (T-NSSAI) from an access and mobility management function (AMF) to the base station, the T-NSSAI comprising at least one user equipment specific temporary single NSSAI (UE-Specific T-S-NSSAI); and storing the T-NSSAI in the base station. The method includes receiving a radio resource control (RRC) signaling message from the user equipment to the base station, the RRC signaling message comprising a UE-Specific T-S-NSSAI corresponding to an allowed S-NSSAI; and selecting the AMF based on the UE-Specific T-S-NSSAI.

In another embodiment, the present disclosure describes a method for protecting privacy of a transmitted network slice selection assistance information (NSSAI) between a user equipment and a base station. The method includes obtaining a T-NSSAI based on a NSSAI, the NSSAI comprising at least one S-NSSAI and the T-NSSAI comprising at least one UE-Specific T-S-NSSAI; generating a mapping relationship between the NSSAI and the T-NSSAI; and storing the mapping relationship between the NSSAI and the T-NSSAI in an AMF.

In another embodiment, the present disclosure describes a method for protecting privacy of a transmitted network slice selection assistance information (NSSAI) between a user equipment and a base station. The method includes determining whether a predetermined condition is satisfied in an AMF. In response to the determining that the predetermined condition is satisfied, the method includes obtaining a new UE-Specific T-S-NSSAI based on an allowed S-NSSAI and update the stored mapping relationship between the allowed S-NSSAI and the old UE-Specific T-S-NSSAI with the new UE-Specific T-S-NSSAI, canceling the old UE-Specific T-S-NSSAI; sending a new T-NSSAI comprising the new UE-Specific T-S-NSSAI to a base station so as to update a stored T-NSSAI in the base station; and sending the new UE-Specific T-S-NSSAI to a user equipment so that the user equipment updates the stored mapping relationship between the allowed S-NSSAI and the old allowed UE-Specific T-S-NSSAI in the user equipment with the new T-S-NSSAI.

In another embodiment, the present disclosure describes a method for protecting privacy of a transmitted network slice selection assistance information (NSSAI) between a user equipment and a base station. The method includes receiving a mapping relationship between the NSSAI and a temporary NSSAI (T-NSSAI) from an access and mobility management function (AMF) to the base station, the NSSAI comprising at least one single NSSAI (S-NSSAI), and the T-NSSAI comprising at least one UE-Specific T-S-NSSAI; and storing the mapping relationship between the NSSAI and the T-NSSAI in the base station. The method includes receiving a radio resource control (RRC) signaling message from the user equipment to the base station, the RRC signaling message comprising a UE-Specific T-S-NSSAI corresponding to an allowed single NSSAI (S-NSSAI); identifying the allowed S-NSSAI based on the UE-Specific T-S-NSSAI in the base station; and selecting the AMF based on the allowed S-NSSAI.

In another embodiment, the present disclosure describes a method for protecting privacy of a transmitted network slice selection assistance information (NSSAI) between a user equipment and a base station. The method includes obtaining a T-NSSAI based on a NSSAI, the NSSAI comprising at least one S-NSSAI and the T-NSSAI comprising at least one UE-Specific T-S-NSSAI; and generating a mapping relationship between the NSSAI and the T-NSSAI. The method includes storing the mapping relationship between the NSSAI and the T-NSSAI in an AMF; receiving an user equipment message from a base station, the user equipment message comprising an allowed S-NSSAI; and validating user equipment rights and slice availability based on the allowed S-NSSAI in the AMF.

In another embodiment, the present disclosure describes a method for protecting privacy of a transmitted network slice selection assistance information (NSSAI) between a user equipment and a base station. The method includes determining whether a predetermined condition is satisfied in an AMF. In response to the determining that the predetermined condition is satisfied, the method includes obtaining a new UE-Specific T-S-NSSAI based on an allowed S-NSSAI and update the stored mapping relationship between the allowed S-NSSAI and the old UE-Specific T-S-NSSAI with the new UE-Specific T-S-NSSAI, canceling the old UE-Specific T-S-NSSAI; obtaining a new mapping relationship between a NSSAI and a new T-NSSAI, the new T-NSSAI comprising the new UE-Specific T-S-NSSAI; sending the new mapping relationship between the NSSAI and the new T-NSSAI to a base station so as to update a stored mapping relationship in the base station; and sending the new UE-Specific T-S-NSSAI to a user equipment so that the user equipment updates the stored mapping relationship between the allowed S-NSSAI and the old allowed UE-Specific T-S-NSSAI in the user equipment.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4B shows a flow diagram of a method for wireless communication.

FIG. 4C shows a flow diagram of a method for wireless communication.

FIG. 4D shows a flow diagram of a method for wireless communication.

FIG. 5B shows a flow diagram of a method for wireless communication.

FIG. 5C shows a flow diagram of a method for wireless communication.

FIG. 7A shows a flow diagram of a method for wireless communication.

FIG. 7B shows a flow diagram of a method for wireless communication.

FIG. 7C shows a flow diagram of a method for wireless communication.

FIG. 7D shows a flow diagram of a method for wireless communication.

FIG. 8 shows a flow diagram of a method for wireless communication.

FIG. 10A shows a flow diagram of a method for wireless communication.

FIG. 10B shows a flow diagram of a method for wireless communication.

FIG. 10C shows a flow diagram of a method for wireless communication.

FIG. 10D shows a flow diagram of a method for wireless communication.

FIG. 11A shows a flow diagram of a method for wireless communication.

FIG. 13A shows a flow diagram of a method for wireless communication.

FIG. 13B shows a flow diagram of a method for wireless communication.

FIG. 13C shows a flow diagram of a method for wireless communication.

FIG. 13D shows a flow diagram of a method for wireless communication.

FIG. 14 shows a flow diagram of a method for wireless communication.

DETAILED DESCRIPTION

Figure 1:
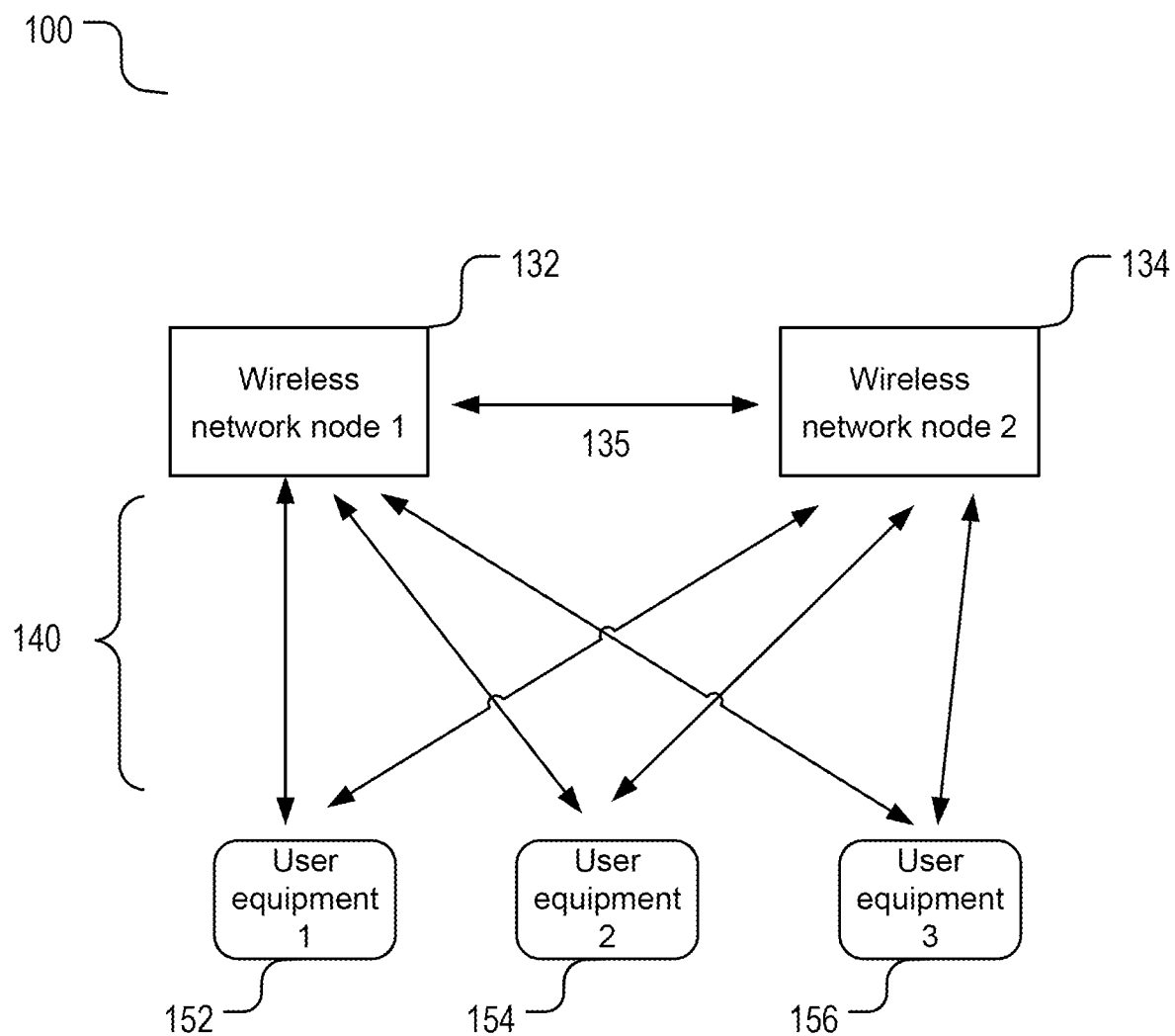
FIG. 1 shows an example of a wireless communication system include one or more wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for protecting privacy of slice identity information. The present disclosure addresses the issues with existing methods wherein during the transmission of a network slice selection assistance information (NSSAI) between a user equipment (UE) and a wireless network node, a concern of privacy of NSSAI may arise. Single network slice selection assistance information (S-NSSAI) may be important in an access stratum (AS) layer and it is important to secure the NSSAI transmission in the AS layer.

A radio access network (RAN) may selects an access and mobility management function (AMF) based on a temporary ID (Temp ID) or NSSAI provided by the UE. In one implementation, a Temp ID may not be available, and a new generation radio access network (NG-RAN) may use the NSSAI provided by the UE to select the appropriate AMF. The NSSAI may be provided by the UE to the NG-RAN via RRC connection establishment. In one implementation, the NG-RAN may use a list of supported S-NSSAI(s) previously received in the NG Setup Response message when selecting the AMF with the NSSAI. This list of supported S-NSSAI(s) may be updated via the AMF Configuration Update message. In another implementation, a NSSAI from the UE may also unavailable, and the NG-RAN may select one of the one or more configured default AMF and route the UE to the selected configured default AMF.

For example, a UE may register over an access type with a public land mobile network (PLMN), and the UE for this PLMN may have a configured NSSAI for this PLMN and an allowed NSSAI for the access type. The UE may provide a requested NSSAI to the network in the AS layer and/or non-access stratum (NAS) layer. The requested NSSAI may contains one or more single-NSSAI (S-NSSAI) corresponding to one or more slice to which the UE wishes to register, in addition to a temporary mobile subscription identifier (TMSI) when one is assigned to the UE. The TMSI may include a 5G-S-TMSI.

NSSAI may contain sensitive information that have privacy concerns when transmitted in clear. For example, a particular NSSAI may be linked to a slice instance exclusively for one or more UE serving police officers, and a security of the NSSAI may be needed against unauthorized person. In existing method, an S-NSSAI may be sent in the clear-text during the radio resource control (RRC) connection establishment procedure, and the user privacy regarding the S-NSSAI is vulnerable. In case the S-NSSAI is related to the critical services (e.g. MCPTT) then the man in the middle may disrupt the services by targeting the user using these services. For another example, S-NSSAI may not be transmitted in initial NAS messages, until security context is established. For another example, by default, S-NSSAI may not be transmitted in AS messages, unless a serving PLMN instructs the UE to do so.

The present disclosure describes methods and devices for protecting privacy of a transmitted network slice selection assistance information (NSSAI) between a user equipment and a base station, thus addressing at least one of the existing issues described above.

FIG. 1 shows a wireless communication system 100 including one or more wireless network node (132 and 134) and one or more user equipment (UE) (152, 154, and 156). The wireless network node may be a base station, which may be a nodeB (NB, e.g., an eNB or gNB) in a mobile telecommunications context. Each of the UE may wirelessly communicate with the wireless network nodes via a plurality of radio channels 140. For example, a first UE 152 may wirelessly communicate with a first wireless network node 132 via a channel including a plurality of radio channels during a certain period of time, and the first UE 152 may also wirelessly communicate with a second wireless network node 134 via a channel including a plurality of radio channels during a certain period of time. Likewise, a second UE 154 and a third UE 156 may wirelessly communicate with the first and second wireless network nodes. The first wireless network node 132 and the second wireless network node 134 may communicate to each other via one or more channel 135.

Figure 2:
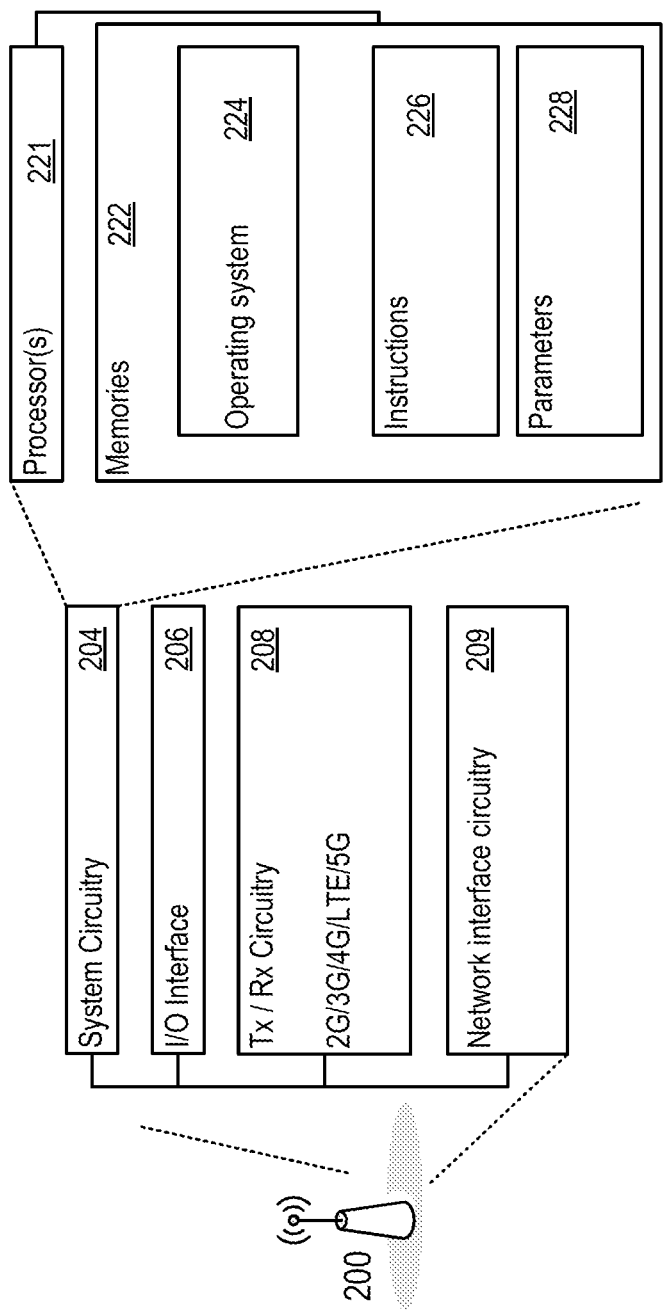
FIG. 2 shows an example of a network node.

FIG. 2 shows an example base station 200. The example base station may include radio Tx/Rx circuitry 208 to receive and transmit with UEs and/or other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
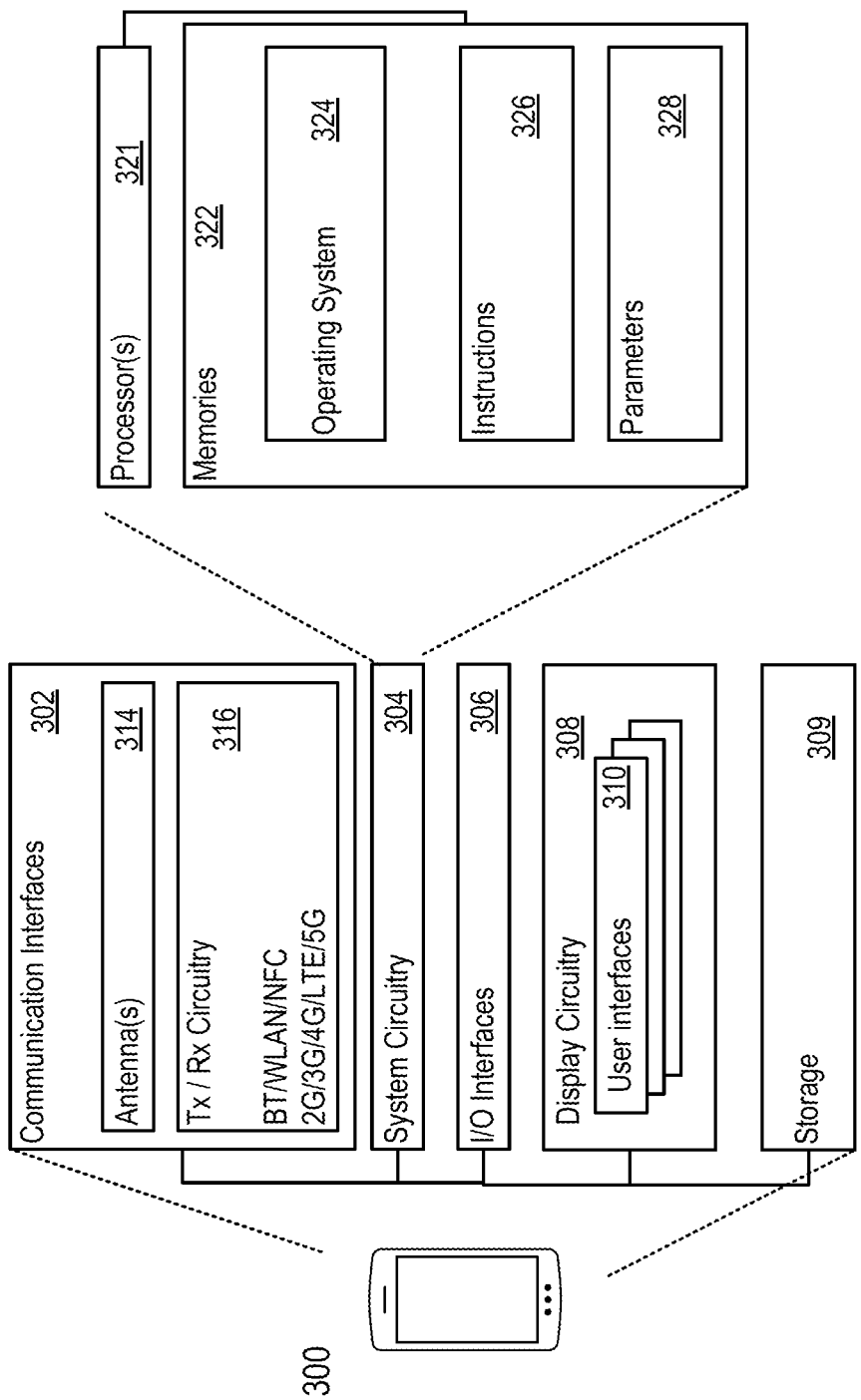
FIG. 3 shows an example of a user equipment.

FIG. 3 shows an example UE 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above.

Embodiments Wherein a Base Station Stores Temporary Network Slice Selection Assistance Information (T-NSSAI)

The present disclosure describe embodiments of methods and devices for protecting privacy of a transmitted network slice selection assistance information (NSSAI) between a user equipment and a base station, wherein the base station stores temporary NSSAI (T-NSSAI).

Figure 4A:
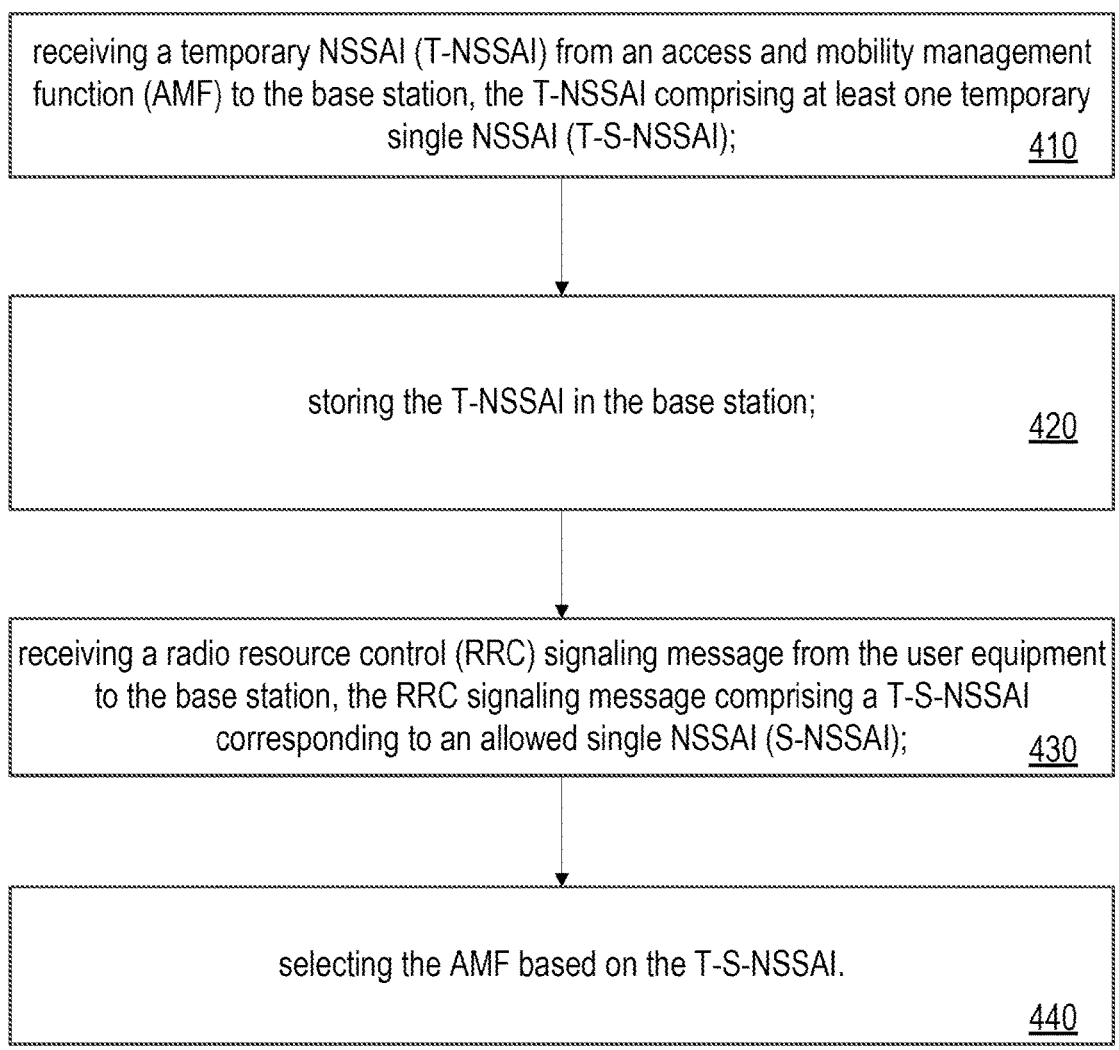
FIG. 4A shows a flow diagram of a method for wireless communication.

In one embodiment, referring to FIG. 4A, a method 400 may include step 410: receiving a temporary NSSAI (T-NSSAI) from an access and mobility management function (AMF) to the base station, the T-NSSAI comprising at least one temporary single NSSAI (T-S-NSSAI); step 420: storing the T-NSSAI in the base station; step 430: receiving a radio resource control (RRC) signaling message from the user equipment to the base station, the RRC signaling message comprising a T-S-NSSAI corresponding to an allowed single NSSAI (S-NSSAI); and step 440: selecting the AMF based on the T-S-NSSAI. In one implementation, the base station may include a new radio node base station (gNB). In another implementation, the RRC signaling message may include a RRC connection setup complete message.

Referring to FIG. 4B, the method 400 may optionally include step 450: receiving a registration accept message during an initial registration procedure from the AMF to the base station, the registration accept message comprising a mapping relationship between at least one allowed S-NSSAI and at least one T-S-NSSAI; and step 460: sending the mapping relationship between at least one allowed S-NSSAI and at least one T-S-NSSAI from the base station to the user equipment so that the user equipment stores the mapping relationship between the at least one allowed S-NSSAI and the at least one T-S-NSSAI.

Referring to FIG. 4C, the method 400 may optionally include step 470: receiving a second T-NSSAI from a second AMF to the base station, the second T-NSSAI comprising at least one T-S-NSSAI; and step 480: storing the second T-NSSAI in the base station.

Referring to FIG. 4D, the method 400 may optionally include step 490: sending an user equipment message from the base station to the AMF, the user equipment message comprising the T-S-NSSAI.

Figure 5A:
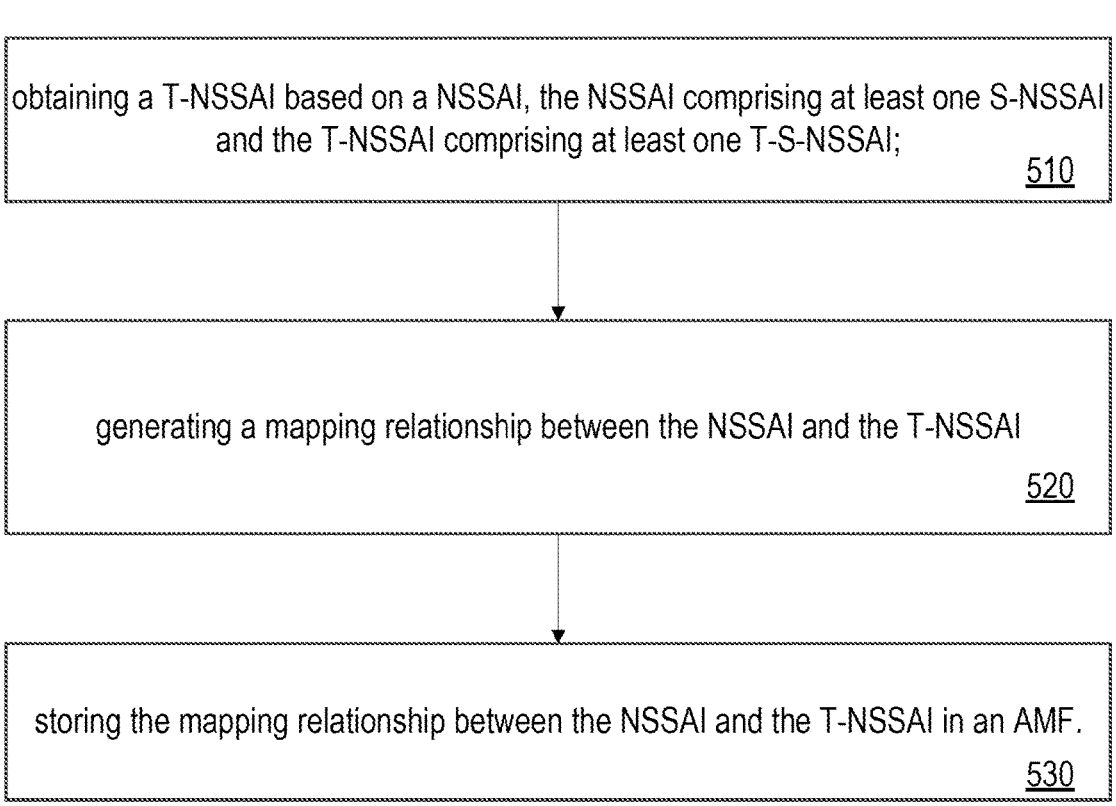
FIG. 5A shows a flow diagram of a method for wireless communication.

In another embodiment, referring to FIG. 5A, a method 500 may include step 510: obtaining a T-NSSAI based on a NSSAI, the NSSAI comprising at least one S-NSSAI and the T-NSSAI comprising at least one T-S-NSSAI; step 520: generating a mapping relationship between the NSSAI and the T-NSSAI; and step 530: storing the mapping relationship between the NSSAI and the T-NSSAI in an AMF.

Referring to FIG. 5B, the step 510 may optionally include step 512: for each S-NSSAI in the NSSAI, calculating a corresponding T-S-NSSAI based on the S-NSSAI according to a predetermined algorithm.

Referring to FIG. 5C, the step 510 may optionally include step 514: for each S-NSSAI in the NSSAI, generating a random information as a corresponding T-S-NSSAI based on the S-NSSAI.

Figure 5D:
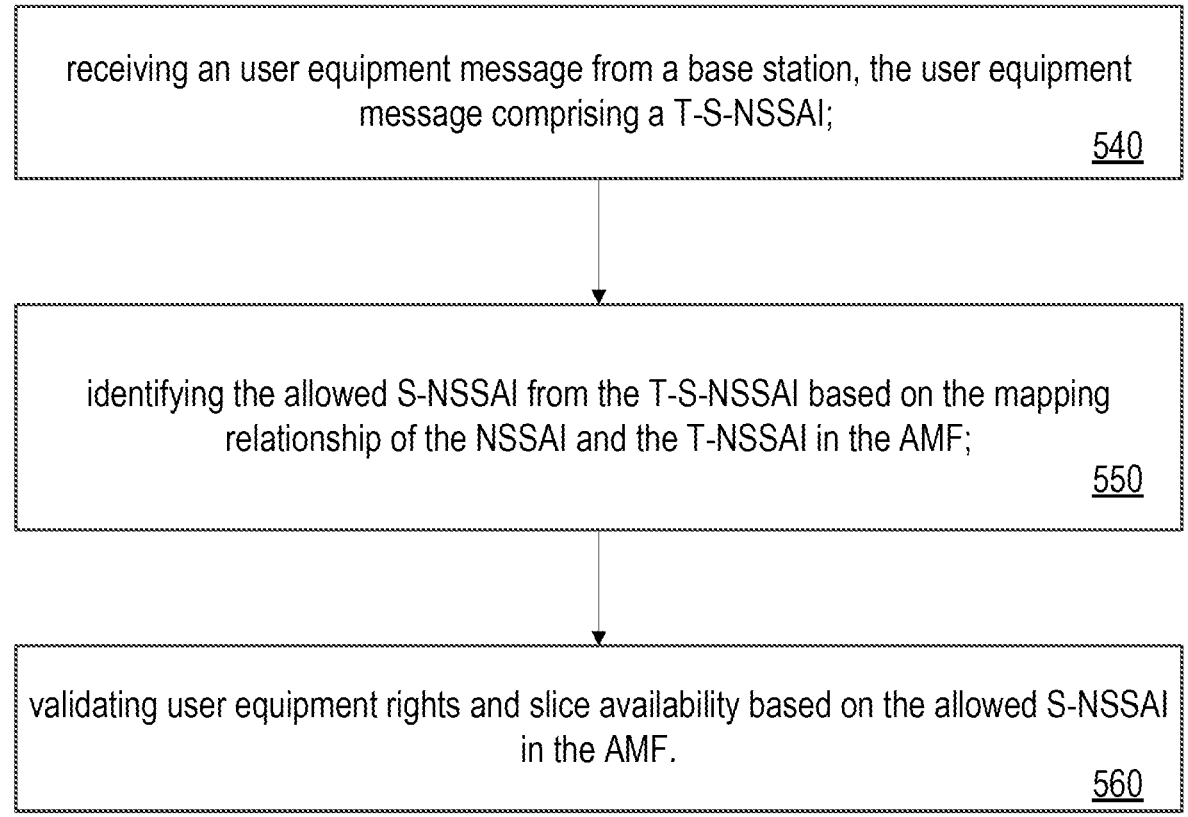
FIG. 5D shows a flow diagram of a method for wireless communication.

Referring to FIG. 5D, the method 500 may optionally include step 540: receiving an user equipment message from a base station, the user equipment message comprising a T-S-NSSAI; step 550: identifying the allowed S-NSSAI from the T-S-NSSAI based on the mapping relationship of the NSSAI and the T-NSSAI in the AMF; and step 560: validating user equipment rights and slice availability based on the allowed S-NSSAI in the AMF.

Figure 6:
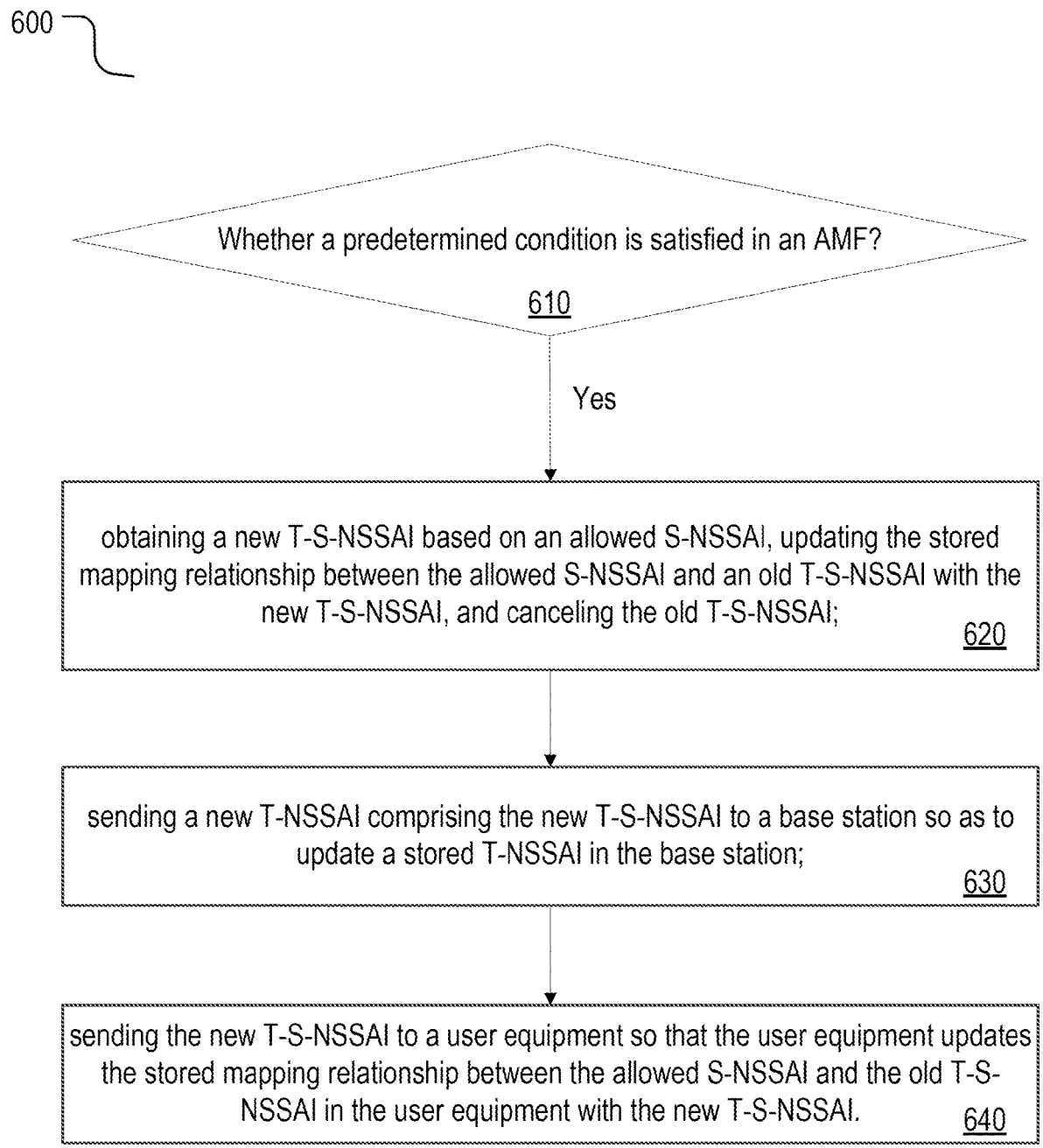
FIG. 6 shows a flow diagram of a method for wireless communication.

In another embodiment, referring to FIG. 6, a method 600 may include step 610: determining whether a predetermined condition is satisfied in an AMF; and in response to the determining that the predetermined condition is satisfied: step 620 obtaining a new T-S-NSSAI based on an allowed S-NSSAI, updating the stored mapping relationship between the allowed S-NSSAI and an old T-S-NSSAI with the new T-S-NSSAI, and canceling the old T-S-NSSAI; step 630 sending a new T-NSSAI comprising the new T-S-NSSAI to a base station so as to update a stored T-NSSAI in the base station; and step 640 sending the new T-S-NSSAI to a user equipment so that the user equipment updates the stored mapping relationship between the allowed S-NSSAI and the old T-S-NSSAI in the user equipment with the new T-S-NSSAI.

In one implementation, the predetermined condition comprises a condition of whether a number of transmitting the T-S-NSSAI reaches a pre-determined number. For example, the pre-determined number may be 1, so that a new T-S-NSSAI is obtained when an old T-S-NSSAI is transmitted once. For another example, the pre-determined number may be 10, so that a new T-S-NSSAI is obtained when an old T-S-NSSAI is transmitted ten times.

In another implementation, the predetermined condition comprises a condition of whether a time duration since the T-S-NSSAI was generated reaches a predetermined duration. For example but not limited to, the predetermined duration may include a range of 0.01 second to 24 hours. For example, the pre-determined duration may be 1 second, so that a new T-S-NSSAI is obtained when an old T-S-NSSAI has been generated more than 1 second ago. For another example, the pre-determined duration may be 10 hours, so that a new T-S-NSSAI is obtained when an old T-S-NSSAI has been generated more than 10 hours ago.

Embodiments Wherein a Base Station Stores a Mapping Relationship Between a NSSAI and a T-NSSAI The present disclosure describe embodiments of methods and devices for protecting privacy of a transmitted network slice selection assistance information (NSSAI) between a user equipment and a base station, wherein the base station stores a mapping relationship between a NSSAI and a T-NSSAI.

In one embodiment, referring to FIG. 7A, a method 700 may include step 710: receiving a mapping relationship between the NSSAI and a temporary NSSAI (T-NSSAI) from an access and mobility management function (AMF) to the base station, the NSSAI comprising at least one single NSSAI (S-NSSAI), and the T-NSSAI comprising at least one temporary single NSSAI (T-S-NSSAI); step 720 storing the mapping relationship between the NSSAI and the T-NSSAI in the base station; step 730 receiving a radio resource control (RRC) signaling message from the user equipment to the base station, the RRC signaling message comprising a T-S-NSSAI corresponding to an allowed single NSSAI (S-NSSAI); step 740 identifying the allowed S-NSSAI based on the T-S-NSSAI in the base station; and step 750 selecting the AMF based on the allowed S-NSSAI. In one implementation, the base station may include a new radio node base station (gNB). In another implementation, the RRC signaling message may include a RRC connection setup complete message.

Referring to FIG. 7B, the method 700 may optionally include step 760: receiving a registration accept message during an initial registration procedure from the AMF to the base station, the registration accept message comprising a mapping relationship between at least one allowed S-NSSAI and at least one T-S-NSSAI; and step 770: sending the mapping relationship between at least one allowed S-NSSAI and at least one T-S-NSSAI from the base station to the user equipment so that the user equipment stores the mapping relationship between the at least one allowed S-NSSAI and the at least one T-S-NSSAI.

Referring to FIG. 7C, the method 700 may optionally include step 780: receiving a second mapping relationship between a second NSSAI and a second T-NSSAI from a second AMF to the base station; and step 790: storing the second mapping relationship between the second NSSAI and the second T-NSSAI in the base station.

Referring to FIG. 7D, the method 700 may optionally include step 799: sending a user equipment message from the base station to the AMF, the user equipment message comprising the allowed S-NSSAI.

In another embodiment, referring to FIG. 8, a method 800 may include step 810: obtaining a T-NSSAI based on a NSSAI, the NSSAI comprising at least one S-NSSAI and the T-NSSAI comprising at least one T-S-NSSAI; step 820: generating a mapping relationship between the NSSAI and the T-NSSAI; step 830: storing the mapping relationship between the NSSAI and the T-NSSAI in an AMF; step 840: receiving an user equipment message from a base station, the user equipment message comprising an allowed S-NSSAI; and step 850: validating user equipment rights and slice availability based on the allowed S-NSSAI in the AMF.

Figure 9:
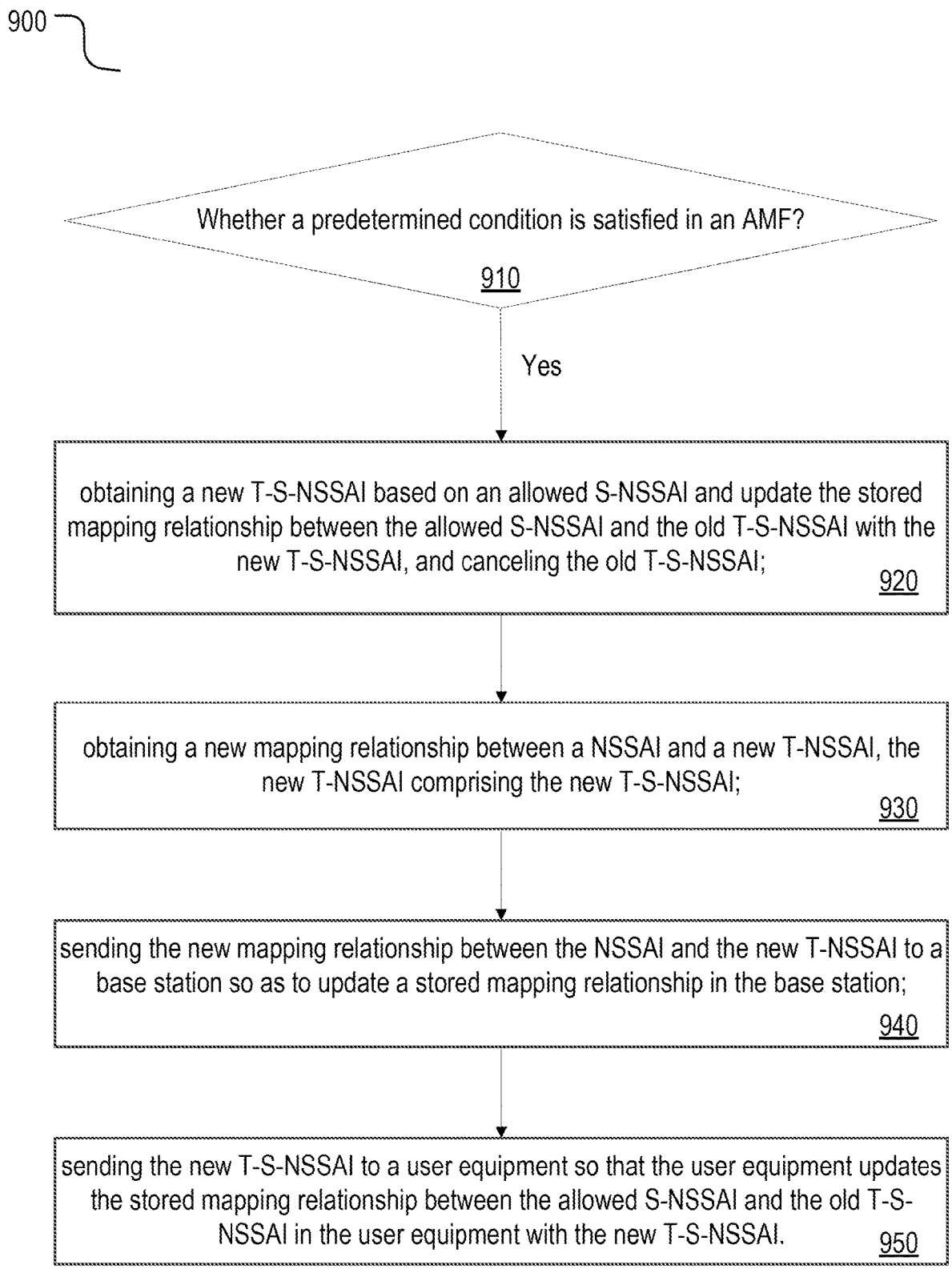
FIG. 9 shows a flow diagram of a method for wireless communication.

In another embodiment, referring to FIG. 9, a method 900 may include step 910: determining whether a predetermined condition is satisfied in an AMF; and in response to the determining that the predetermined condition is satisfied: step 920 obtaining a new T-S-NSSAI based on an allowed S-NSSAI and update the stored mapping relationship between the allowed S-NSSAI and the old T-S-NSSAI with the new T-S-NSSAI, and canceling the old T-S-NSSAI; step 930 obtaining a new mapping relationship between a NSSAI and a new T-NSSAI, the new T-NSSAI comprising the new T-S-NSSAI; step 940 sending the new mapping relationship between the NSSAI and the new T-NSSAI to a base station so as to update a stored mapping relationship in the base station; and step 950: sending the new T-S-NSSAI to a user equipment so that the user equipment updates the stored mapping relationship between the allowed S-NSSAI and the old T-S-NSSAI in the user equipment with the new T-S-NSSAI.

In one implementation, the predetermined condition comprises a condition of whether a number of transmitting the T-S-NSSAI reaches a pre-determined number. For example, the pre-determined number may be 1, so that a new T-S-NSSAI is obtained when an old T-S-NSSAI is transmitted once. For another example, the pre-determined number may be 10, so that a new T-S-NSSAI is obtained when an old T-S-NSSAI is transmitted ten times.

In another implementation, the predetermined condition comprises a condition of whether a time duration since the T-S-NSSAI was generated reaches a predetermined duration. For example but not limited to, the predetermined duration may include a range of 0.01 second to 24 hours. For example, the pre-determined duration may be 1 second, so that a new T-S-NSSAI is obtained when an old T-S-NSSAI has been generated more than 1 second ago. For another example, the pre-determined duration may be 10 hours, so that a new T-S-NSSAI is obtained when an old T-S-NSSAI has been generated more than 10 hours ago.

Embodiments Wherein a Base Station Stores T-NSSAI Including User Equipment Specific T-S-NSSAI (UE-Specific T-S-NSSAI)

The present disclosure describe embodiments of methods and devices for protecting privacy of a transmitted network slice selection assistance information (NSSAI) between a user equipment and a base station, wherein the base station stores temporary NSSAI (T-NSSAI) including user equipment specific T-S-NSSAI (UE-Specific T-S-NSSAI).

In one embodiment, referring to FIG. 10A, a method 1000 may include step 1010: receiving a temporary NSSAI (T-NSSAI) from an access and mobility management function (AMF) to the base station, the T-NSSAI comprising at least one user equipment specific temporary single NSSAI (UE-Specific T-S-NSSAI); step 1020 storing the T-NSSAI in the base station; step 1030 receiving a radio resource control (RRC) signaling message from the user equipment to the base station, the RRC signaling message comprising a UE-Specific T-S-NSSAI corresponding to an allowed S-NSSAI; and step 1040 selecting the AMF based on the UE-Specific T-S-NSSAI. In one implementation, the base station may include a new radio node base station (gNB). In another implementation, the RRC signaling message may include a RRC connection setup complete message.

Referring to FIG. 10B, the method 1000 may optionally include step 1050: receiving a registration accept message during an initial registration procedure from the AMF to the base station, the registration accept message comprising a mapping relationship between at least one allowed S-NSSAI and at least one UE-Specific T-S-NSSAI; and step 1060 sending the mapping relationship between the at least one allowed S-NSSAI and the at least one UE-Specific T-S-NSSAI from the base station to the user equipment so that the user equipment stores the mapping relationship between the at least one allowed S-NSSAI and the at least one UE-Specific T-S-NSSAI.

Referring to FIG. 10C, the method 1000 may optionally include step 1070: receiving a second T-NSSAI from a second AMF to the base station, the second T-NSSAI comprising at least one UE-Specific T-S-NSSAI; and step 1080 storing the second T-NSSAI in the base station.

Referring to FIG. 10D, the method 1000 may optionally include step 1090: sending an user equipment message from the base station to the AMF, the user equipment message comprising the UE-Specific T-S-NSSAI.

In another embodiment, referring to FIG. 11A, a method 1100 may include step 1110: obtaining a T-NSSAI based on a NSSAI, the NSSAI comprising at least one S-NSSAI and the T-NSSAI comprising at least one UE-Specific T-S-NSSAI; step 1120: generating a mapping relationship between the NSSAI and the T-NSSAI; and step 1130: storing the mapping relationship between the NSSAI and the T-NSSAI in an AMF.

In one implementation, the step 1110 may optionally include, for each S-NSSAI in the NSSAI, calculating a corresponding UE-Specific T-S-NSSAI based on the S-NSSAI and an identifier of the user equipment according to a predetermined algorithm. For example but not limited to, the identifier of the user equipment may include a temporary mobile subscription identifier (TMSI) of the user equipment.

In another implementation, the step 1110 may optionally include, for each S-NSSAI in the NSSAI, generating a random information as a corresponding UE-Specific T-S-

NSSAI based on the S-NSSAI and an identifier of the user equipment. For example but not limited to, the identifier of the user equipment may include a temporary mobile subscription identifier (TMSI) of the user equipment.

Figure 11B:
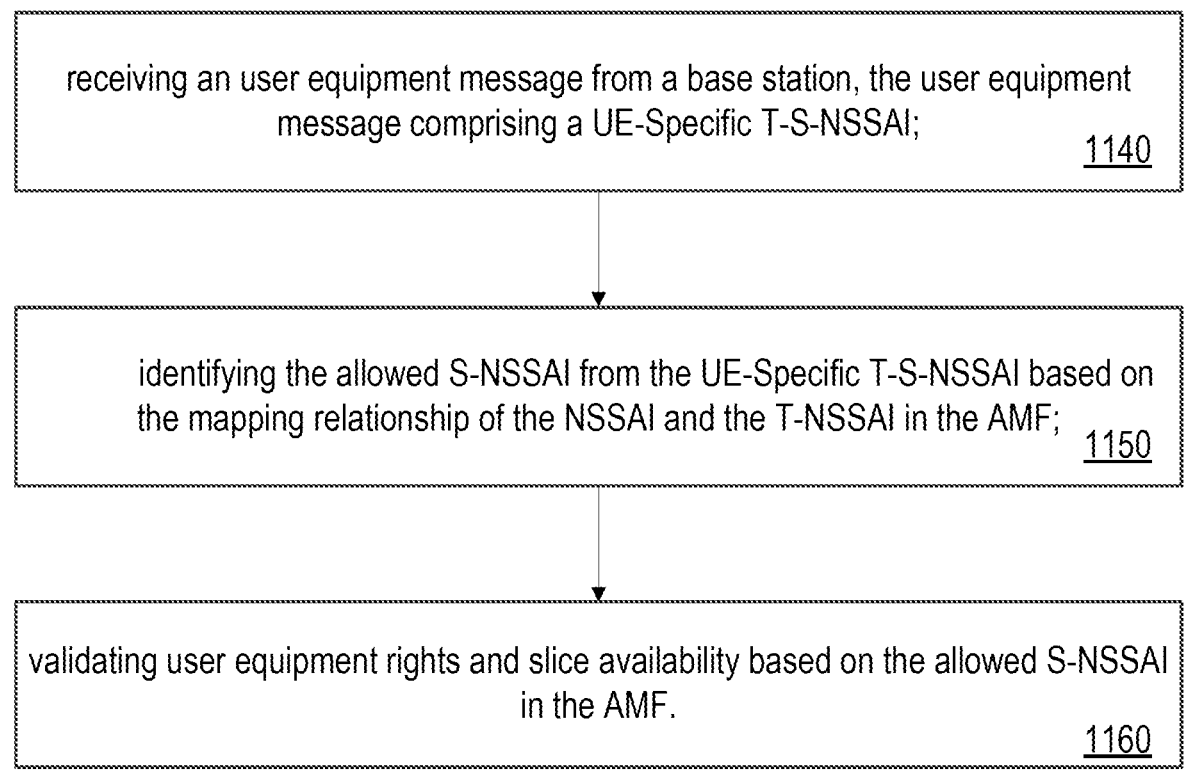
FIG. 11B shows a flow diagram of a method for wireless communication.

Referring to FIG. 11B, the method 1100 may optionally include step 1140: receiving an user equipment message from a base station, the user equipment message comprising a UE-Specific T-S-NSSAI; step 1150 identifying the allowed S-NSSAI from the UE-Specific T-S-NSSAI based on the mapping relationship of the NSSAI and the T-NSSAI in the AMF; and step 1160: validating user equipment rights and slice availability based on the allowed S-NSSAI in the AMF.

Figure 12:
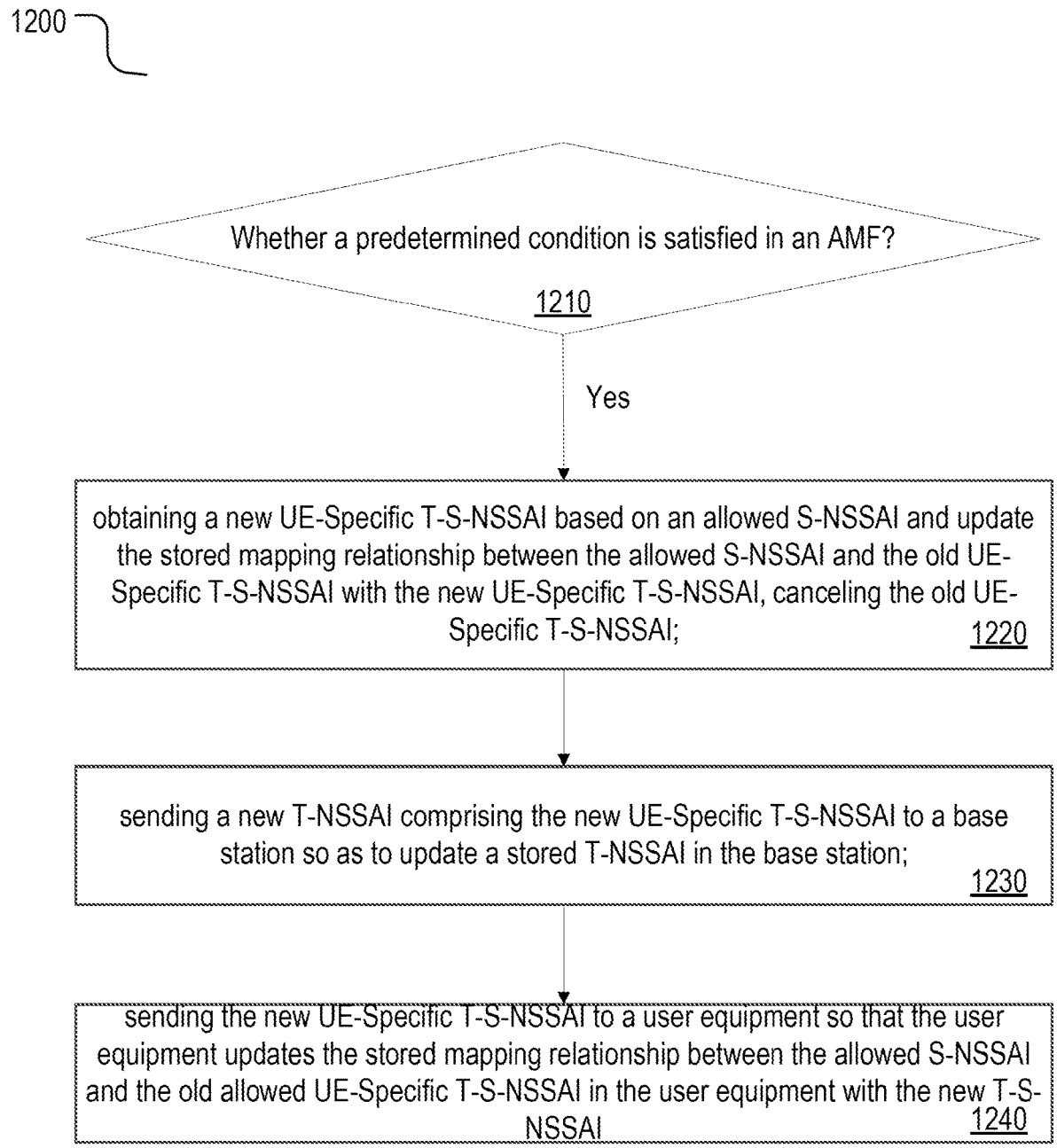
FIG. 12 shows a flow diagram of a method for wireless communication.

In another embodiment, referring to FIG. 12, a method 1200 may include step 1210: determining whether a predetermined condition is satisfied in an AMF; in response to the determining that the predetermined condition is satisfied: step 1220 obtaining a new UE-Specific T-S-NSSAI based on an allowed S-NSSAI and update the stored mapping relationship between the allowed S-NSSAI and the old UE-Specific T-S-NSSAI with the new UE-Specific T-S-NSSAI, canceling the old UE-Specific T-S-NSSAI; step 1230 sending a new T-NSSAI comprising the new UE-Specific T-S-NSSAI to a base station so as to update a stored T-NSSAI in the base station; and step 1240 sending the new UE-Specific T-S-NSSAI to a user equipment so that the user equipment updates the stored mapping relationship between the allowed S-NSSAI and the old allowed UE-Specific T-S-NSSAI in the user equipment with the new T-S-NSSAI.

In one implementation, the predetermined condition comprises a condition of whether a number of transmitting the T-S-NSSAI reaches a pre-determined number. For example, the pre-determined number may be 1, so that a new T-S-NSSAI is obtained when an old T-S-NSSAI is transmitted once. For another example, the pre-determined number may be 10, so that a new T-S-NSSAI is obtained when an old T-S-NSSAI is transmitted ten times.

In another implementation, the predetermined condition comprises a condition of whether a time duration since the T-S-NSSAI was generated reaches a predetermined duration. For example but not limited to, the predetermined duration may include a range of 0.01 second to 24 hours. For example, the pre-determined duration may be 1 second, so that a new T-S-NSSAI is obtained when an old T-S-NSSAI has been generated more than 1 second ago. For another example, the pre-determined duration may be 10 hours, so that a new T-S-NSSAI is obtained when an old T-S-NSSAI has been generated more than 10 hours ago.

In one implementation, the step 1220 may optionally include, for each S-NSSAI in the NSSAI, calculating a corresponding UE-Specific T-S-NSSAI based on the S-NSSAI and an identifier of the user equipment according to a predetermined algorithm. For example but not limited to, the identifier of the user equipment may include a temporary mobile subscription identifier (TMSI) of the user equipment.

In another implementation, the step 1220 may optionally include, for each S-NSSAI in the NSSAI, generating a random information as a corresponding UE-Specific T-S-NSSAI based on the S-NSSAI and an identifier of the user equipment. For example but not limited to, the identifier of the user equipment may include a temporary mobile subscription identifier (TMSI) of the user equipment.

Embodiments Wherein a Base Station Stores a Mapping Relationship Between a NSSAI and a T-NSSAI Including User Equipment Specific T-S-NSSAI (UE-Specific T-S-NSSAI)

The present disclosure describe embodiments of methods and devices for protecting privacy of a transmitted network slice selection assistance information (NSSAI) between a user equipment and a base station, wherein the base station stores a mapping relationship between a NSSAI and a T-NSSAI including user equipment specific T-S-NSSAI (UE-Specific T-S-NSSAI).

In one embodiment, referring to FIG. 13A, a method 1300 may include step 1310: receiving a mapping relationship between the NSSAI and a temporary NSSAI (T-NSSAI) from an access and mobility management function (AMF) to the base station, the NSSAI comprising at least one single NSSAI (S-NSSAI), and the T-NSSAI comprising at least one UE-Specific T-S-NSSAI; step 1320 storing the mapping relationship between the NSSAI and the T-NSSAI in the base station; step 1330 receiving a radio resource control (RRC) signaling message from the user equipment to the base station, the RRC signaling message comprising a UE-Specific T-S-NSSAI corresponding to an allowed single NSSAI (S-NSSAI); step 1340 identifying the allowed S-NSSAI based on the UE-Specific T-S-NSSAI in the base station; and step 1350 selecting the AMF based on the allowed S-NSSAI. In one implementation, the base station may include a new radio node base station (gNB). In another implementation, the RRC signaling message may include a RRC connection setup complete message.

Referring to FIG. 13B, the method 1300 may optionally include step 1360: receiving a registration accept message during an initial registration procedure from the AMF to the base station, the registration accept message comprising a mapping relationship between at least one allowed S-NSSAI and at least one UE-Specific T-S-NSSAI; and step 1370 sending the mapping relationship between at least one allowed S-NSSAI and at least one UE-Specific T-S-NSSAI from the base station to the user equipment so that the user equipment stores the mapping relationship between the at least one allowed S-NSSAI and the at least one UE-Specific T-S-NSSAI.

Referring to FIG. 13C, the method 1300 may optionally include step 1380: receiving a second mapping relationship between a second NSSAI and a second T-NSSAI from a second AMF to the base station; and step 1390 storing the second mapping relationship between the second NSSAI and the second T-NSSAI in the base station.

Referring to FIG. 13D, the method 1300 may optionally include step 1399: sending an user equipment message from the base station to the AMF, the user equipment message comprising the allowed S-NSSAI.

In another embodiment, referring to FIG. 14, a method 1400 may include step 1410. obtaining a T-NSSAI based on a NSSAI, the NSSAI comprising at least one S-NSSAI and the T-NSSAI comprising at least one UE-Specific T-S-NSSAI; step 1420 generating a mapping relationship between the NSSAI and the T-NSSAI; step 1430 storing the mapping relationship between the NSSAI and the T-NSSAI in an AMF; step 1440 receiving an user equipment message from a base station, the user equipment message comprising an allowed S-NSSAI; and step 1450 validating user equipment rights and slice availability based on the allowed S-NSSAI in the AMF.

In one implementation, the step 1410 may optionally include, for each S-NSSAI in the NSSAI, calculating a corresponding UE-Specific T-S-NSSAI based on the S-NSSAI and an identifier of the user equipment according to a predetermined algorithm. For example but not limited to, the identifier of the user equipment may include a temporary mobile subscription identifier (TMSI) of the user equipment.

In another implementation, the step 1410 may optionally include, for each S-NSSAI in the NSSAI, generating a random information as a corresponding UE-Specific T-S-NSSAI based on the S-NSSAI and an identifier of the user equipment. For example but not limited to, the identifier of the user equipment may include a temporary mobile subscription identifier (TMSI) of the user equipment.

Figure 15:
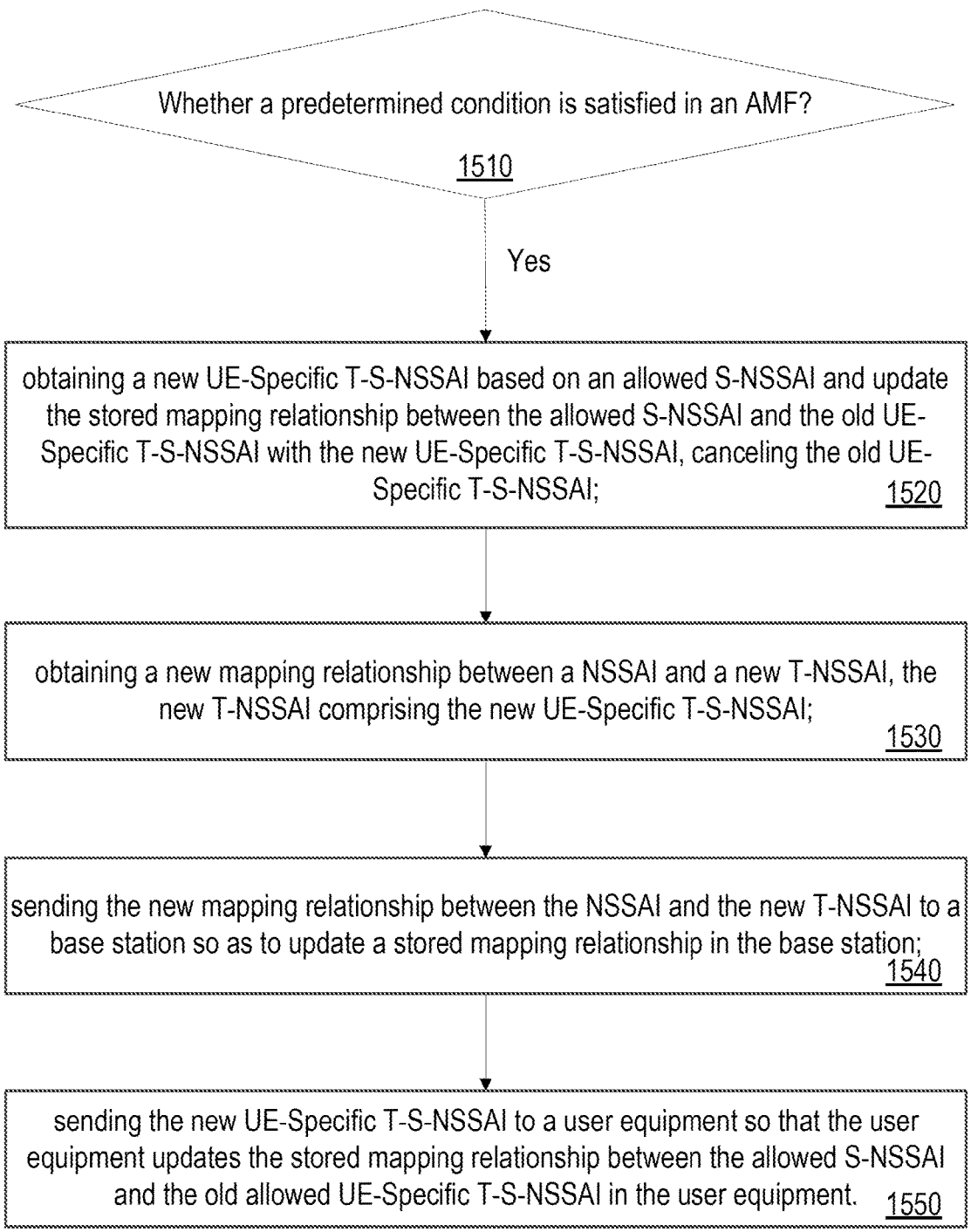
FIG. 15 shows a flow diagram of a method for wireless communication.

In another embodiment, referring to FIG. 15, a method 1500 may include step 1510: determining whether a predetermined condition is satisfied in an AMF; and in response to the determining that the predetermined condition is satisfied: step 1520 obtaining a new UE-Specific T-S-NSSAI based on an allowed S-NSSAI and update the stored mapping relationship between the allowed S-NSSAI and the old UE-Specific T-S-NSSAI with the new UE-Specific T-S-NSSAI, canceling the old UE-Specific T-S-NSSAI; step 1530 obtaining a new mapping relationship between a NSSAI and a new T-NSSAI, the new T-NSSAI comprising the new UE-Specific T-S-NSSAI; step 1540 sending the new mapping relationship between the NSSAI and the new T-NSSAI to a base station so as to update a stored mapping relationship in the base station; and step 1550 sending the new UE-Specific T-S-NSSAI to a user equipment so that the user equipment updates the stored mapping relationship between the allowed S-NSSAI and the old allowed UE-Specific T-S-NSSAI in the user equipment.

In one implementation, the predetermined condition comprises a condition of whether a number of transmitting the T-S-NSSAI reaches a pre-determined number. For example, the pre-determined number may be 1, so that a new T-S-NSSAI is obtained when an old T-S-NSSAI is transmitted once. For another example, the pre-determined number may be 10, so that a new T-S-NSSAI is obtained when an old T-S-NSSAI is transmitted ten times.

In another implementation, the predetermined condition comprises a condition of whether a time duration since the T-S-NSSAI was generated reaches a predetermined duration. For example but not limited to, the predetermined duration may include a range of 0.01 second to 24 hours. For example, the pre-determined duration may be 1 second, so that a new T-S-NSSAI is obtained when an old T-S-NSSAI has been generated more than 1 second ago. For another example, the pre-determined duration may be 10 hours, so that a new T-S-NSSAI is obtained when an old T-S-NSSAI has been generated more than 10 hours ago.

In one implementation, the step 1520 may optionally include, for each S-NSSAI in the NSSAI, calculating a corresponding UE-Specific T-S-NSSAI based on the S-NSSAI and an identifier of the user equipment according to a predetermined algorithm. For example but not limited to, the identifier of the user equipment may include a temporary mobile subscription identifier (TMSI) of the user equipment.

In another implementation, the step 1520 may optionally include, for each S-NSSAI in the NSSAI, generating a random information as a corresponding UE-Specific T-S-NSSAI based on the S-NSSAI and an identifier of the user equipment. For example but not limited to, the identifier of the user equipment may include a temporary mobile subscription identifier (TMSI) of the user equipment.

The present disclosure describes methods, apparatus, and computer-readable medium for wireless communication. The present disclosure addressed the issues with protecting privacy of a transmitted NSSAI between a user equipment and a base station. The methods, devices, and computer-readable medium described in the present disclosure may facilitate the performance of protecting privacy of a transmitted NSSAI between a user equipment and a base station. The methods, devices, and computer-readable medium described in the present disclosure may also increase security of a transmitted NSSAI between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
protecting privacy of a transmitted network slice selection assistance information (NSSAI) between a user equipment and a base station by performing:
receiving a temporary NSSAI (T-NSSAI) from an access and mobility management function (AMF) to the base station, the T-NSSAI comprising at least one temporary single NSSAI (T-S-NSSAI);
storing the T-NSSAI in the base station;
receiving a radio resource control (RRC) signaling message from the user equipment to the base station, the RRC signaling message comprising a T-S-NSSAI corresponding to an allowed single NSSAI (S-NSSAI);
selecting the AMF based on the T-S-NSSAI;
receiving a registration accept message during an initial registration procedure from the AMF to the base station, the registration accept message comprising a mapping relationship between at least one allowed S-NSSAI and at least one T-S-NSSAI; and
sending the mapping relationship between at least one allowed S-NSSAI and at least one T-S-NSSAI from the base station to the user equipment so that the user equipment stores the mapping relationship between the at least one allowed S-NSSAI and the at least one T-S-NSSAI.

2. The method according to claim 1, wherein:
the base station comprises a new radio node base station (gNB); and
the RRC signaling message comprises a RRC connection setup complete message.

3. The method according to claim 1, the method further comprising:
receiving a second T-NSSAI from a second AMF to the base station, the second T-NSSAI comprising at least one T-S-NSSAI; and
storing the second T-NSSAI in the base station.

4. The method according to claim 1, the method further comprising:
sending an user equipment message from the base station to the AMF, the user equipment message comprising the T-S-NSSAI.

5. A non-transitory computer-readable program medium storing instructions, wherein, the instructions, when executed by a processor, are configured to cause the processor to implement the method according to claim 1.

6. A method for wireless communication, the method comprising:
protecting privacy of a transmitted network slice selection assistance information (NSSAI) between a user equipment and a base station by performing:
obtaining a temporary NSSAI (T-NSSAI) based on a NSSAI, the NSSAI comprising at least one single NSSAI (S-NSSAD) and the T-NSSAI comprising at least one temporary single NSSAI (T-S-NSSAI);
generating a mapping relationship between the NSSAI and the T-NSSAI;
storing the mapping relationship between the NSSAI and the T-NSSAI in an access and mobility management function (AMF); and
sending a registration accept message during an initial registration procedure to the base station, the registration accept message comprising the mapping relationship between the NSSAI and the T-NSSAI, so that the base station is configured to send the mapping relationship between the NSSAI and the T-NSSAI to the user equipment to be configured to store the mapping relationship between the NSSAI and the T-NSSAI.

7. The method according to claim 6, wherein obtaining the T-NSSAI based on the NSSAI comprises:
for each S-NSSAI in the NSSAI, calculating a corresponding T-S-NSSAI based on the S-NSSAI according to a predetermined algorithm.

8. The method according to claim 6, wherein obtaining the T-NSSAI based on the NSSAI comprises:
for each S-NSSAI in the NSSAI, generating a random information as a corresponding T-S-NSSAI based on the S-NSSAI.

9. The method according to claim 6, the method further comprising:
receiving an user equipment message from the base station, the user equipment message comprising a T-S-NSSAI;
identifying an allowed S-NSSAI from the T-S-NSSAI based on the mapping relationship of the NSSAI and the T-NSSAI in the AMF; and
validating user equipment rights and slice availability based on the allowed S-NSSAI in the AMF.

10. An apparatus comprising:
a memory storing instructions; and
a processor in communication with the memory, wherein, when the processor executes the instructions, the processor is configured to cause the apparatus to perform the method according to claim 6.

11. A non-transitory computer-readable program medium storing instructions, wherein, the instructions, when executed by a processor, are configured to cause the processor to implement the method according to claim 6.

12. An apparatus comprising:
a memory storing instructions; and
a processor in communication with the memory, wherein, when the processor executes the instructions, the processor is configured to cause the apparatus to perform:
protecting privacy of a transmitted network slice selection assistance information (NSSAI) between a user equipment and the apparatus by:
receiving a temporary NSSAI (T-NSSAI) from an access and mobility management function (AMF) to the apparatus, the T-NSSAI comprising at least one temporary single NSSAI (T-S-NSSAI),
storing the T-NSSAI in the apparatus,
receiving a radio resource control (RRC) signaling message from the user equipment to the apparatus, the RRC signaling message comprising a T-S-NSSAI corresponding to an allowed single NSSAI (S-NSSAI),
selecting the AMF based on the T-S-NSSAI,
receiving a registration accept message during an initial registration procedure from the AMF to the base station, the registration accept message comprising a mapping relationship between at least one allowed S-NSSAI and at least one T-S-NSSAI, and
sending the mapping relationship between at least one allowed S-NSSAI and at least one T-S-NSSAI from the base station to the user equipment so that the user equipment stores the mapping relationship between the at least one allowed S-NSSAI and the at least one T-S-NSSAI.

13. The apparatus according to claim 12, wherein:
the apparatus comprises a new radio node base station (gNB); and
the RRC signaling message comprises a RRC connection setup complete message.

14. The apparatus according to claim 12, wherein, when the processor executes the instructions, the processor is configured to further cause the apparatus to perform:
receiving a second T-NSSAI from a second AMF to the apparatus, the second T-NSSAI comprising at least one T-S-NSSAI; and
storing the second T-NSSAI in the apparatus.

15. The apparatus according to claim 12, wherein, when the processor executes the instructions, the processor is configured to further cause the apparatus to perform:
sending an user equipment message from the apparatus to the AMF, the user equipment message comprising the T-S-NSSAI.

* * * * *